March 25, 1952  S. H. LIEBSON  2,590,108
CHLORINE COUNTER
Filed April 30, 1948
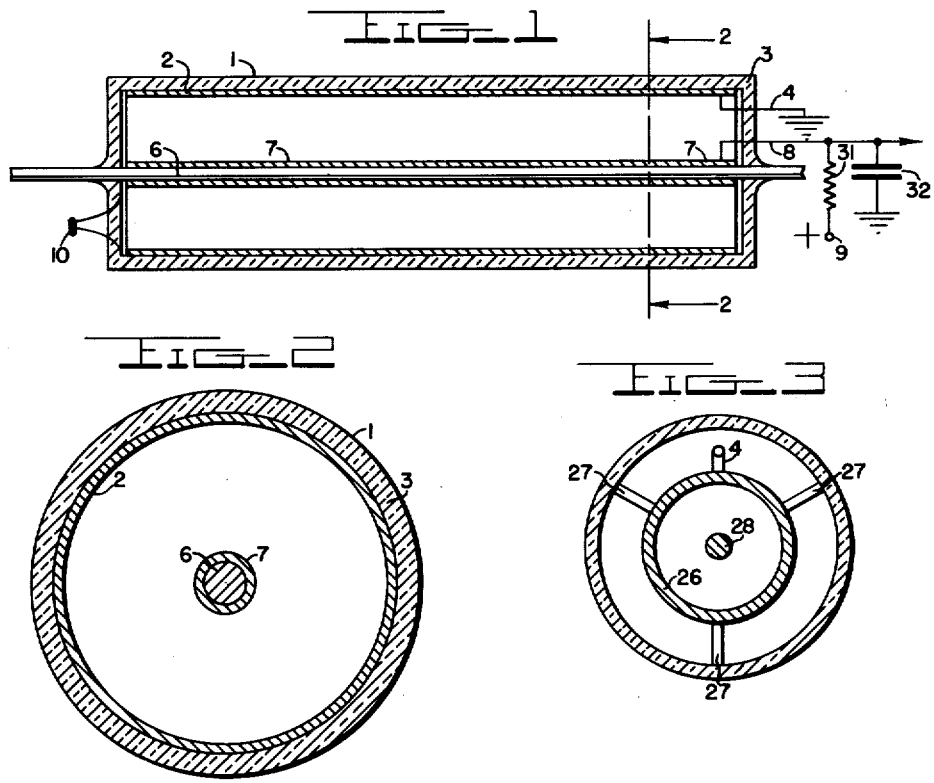
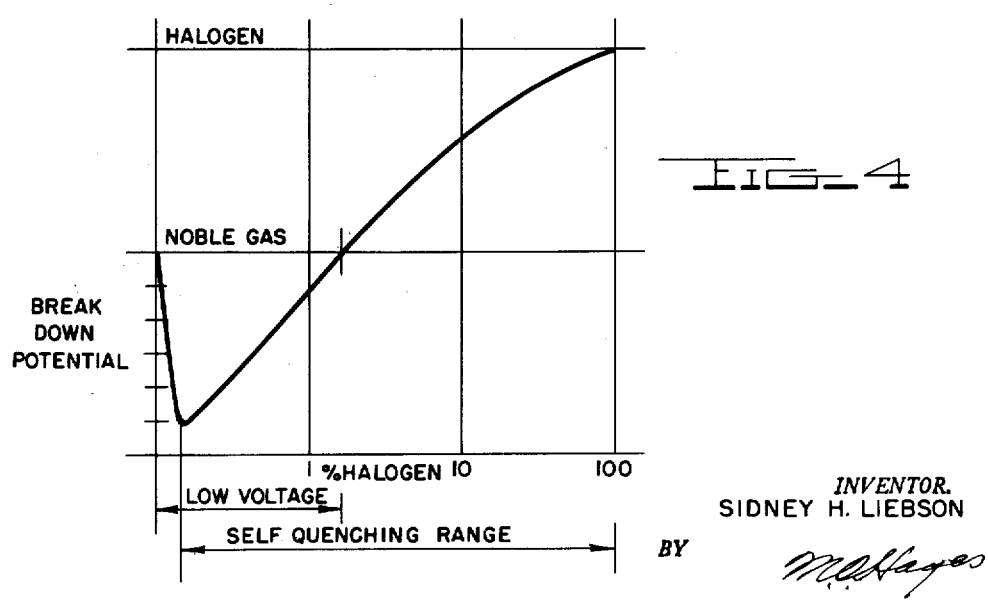
INVENTOR.
SIDNEY H. LIEBSON
ATTORNEY Patented Mar. 25, 1952

2,590,108

UNITED STATES PATENT OFFICE 2,590,108

CHLORINE COUNTER

Sidney H. Liebson, Washington, D. C.

Application April 30, 1948, Serial No. 24,294

8 Claims. (Cl. 313—93)

(Granted under the act of March 3, 1883, as amended April 30, 1928; 370 O. G. 757)

This application is a continuation-in-part of application Serial No. 758,972 filed July 3, 1947, now Patent No. 2,474,851.

This invention relates to radiation and particle counters. Such counters have been previously used in the form of Geiger counters. Counters of the present invention may operate on the same principles as Geiger counters. On the other hand, the invention comprehends counters which serve the same purpose as Geiger counters, but operate to count through entirely new physical principles. These latter counters offer novel advantages over previously known counters. Further, the new method of operation is not limited to the specific counters herein disclosed, the invention comprehending a broad class of counting devices and novel methods therefor.

The counters of the present invention characteristically employ chlorine as a constituent of the gas filling. The gas may be used alone, or in combination with other gases. The other gases are preferably the noble gases lighter than radon. Certain of these have preferable characteristics for various specialized purposes, as will appear in detail hereafter.

In some cases gases other than the chlorine and the noble gases may be present without deleterious effect. The necessary gases mentioned should be employed in spectroscopically pure form, however, so that undesired or unknown constituents are avoided. Combinations of noble gases also may be used.

In the employment of chlorine in counters, it has been found that the operating characteristics depend on the proportion of chlorine present in the active constituents.

Larger amounts of chlorine, up to 100 per cent, provide self quenching counters. The function of the chlorine is similar to that of organic vapors previously used in self quenching Geiger counters. The elementary gas is not destroyed in the gas volume during operation of the tube, however, as is the complex organic molecule. The counting lifetime of a tube employing chlorine instead of an organic vapor is much longer than previously known self quenching tubes. Electrode elements not substantially reactive with the gas under operating conditions should be used, manifestly, but such are readily obtained. Carbon electrodes offer a satisfactory material, for example. Tungsten is also sufficiently nonreactive for practical use.

For self quenching operation, particular choice of the cathode surface is necessary. With noble gases lighter than argon, small amounts of chlorine afford low voltage counters. Their sensitivity and counting speed is about equal to previously known high voltage counters. They may be self quenching, and in part the reduced voltage operating range overlaps the self quenching range in the proportion of chlorine present.

At very low amounts of chlorine, reduced voltage operation occurs below the range wherein sufficient chlorine is present to effect self quenching.

It is, therefore, apparent that chlorine provides a suitable gas filler for counters. With suitable cathode surfaces, the counters are self quenching when enough chlorine is present for such operation. As the amount of chlorine is decreased, operation at reduced voltage is obtained with some noble gases, and very low operating voltages may be used if desired. With such gases, the range of reduced voltage operation extends below the amounts of chlorine necessary for self quenching.

The operation of counters employing chlorine is complex. Re-ignition is believed to be dependent upon relation between the cathode and the chlorine. Operation of counters employing chlorine and noble gases as active constituents is believed to depend upon excitation of the noble gas and transfer of the energy therefrom to the chlorine for ionization. While the theory of operation of counters of this invention, and those of more conventional counters, set forth herein, differs in various respects from previously accepted theory; it has been derived from experimental investigations. The theory is offered as the best available and not in limitation of the invention.

As the ranges of chlorine employed in self quenching operation is wide, extending from less than one per cent to 100 per cent, the quenching operation may be considered first.

For a counter to be self quenching, the ionization initiated by radiation or a particle must not be re-ignited after extinguishment by formation of the ion sheath at the anode. The ion sheath formed in the process is drawn to the cathode and neutralized. It is believed that the ions, upon neutralization, may take up electrons in an energy level higher than the ground state. If the energy of the excited state is greater than that required to extract an electron from the cathode surface, the resulting emission present can refire the tube. In the counters of the present invention, the work function of the cathode is greater than any metastables state energy level of chlorine, and when the chlorine is ionized, the ions may therefore be collected without secondary emission to provide self quenching operation.

Carbon, brass, tin, copper, stainless steel, tantalum, and zinc have suitable work functions.

In a counter whose filling consists of chlorine, or in which chlorine carries substantially all the discharge by ionization, such self quenching operation is obtained.

Where chlorine is used in connection with another gas, actively taking part in the operation of the tube, such as a noble gas lighter than radon, the quenching operation of the counter is similar to conventional self quenching counters if the chlorine is present to the extent of fraction of a per cent or more. Chlorine may be thus used with xenon, krypton, and argon, and acts, with suitable cathodes, similarly to organic vapor quenching agents. It has the advantage of being nondestructively employed, as mentioned above.

Argon counters, having large heavy molecules, are preferable for X-ray counting. With chlorine they offer a self quenching counter operating at rather high voltages of the same order of magnitude as organic vapor-inert gas mixtures.

Chlorine may be used with helium and neon. The operation of such counters is similar to those previously described, but since their importance is thought far greater, their description has been postponed to describe the self quenching operation. This latter is the same in all the counters described.

The counters employing the lighter gases are distinguished from the argon, krypton and xenon counters in that operating potentials below the breakdown potential of pure noble gas may be obtained.

This is believed due to energy interchange between the noble gas and the chlorine. These noble gases have metastable states whose energy levels are of the same order as the energy required to ionize chlorine. The noble gas may be excited by radiation or particles and then act, in releasing its energy, to ionize the chlorine.

In some instances, in experimental observations, ionization has occurred, although the energy of the metastable state has been not entirely sufficient to obtain ionization of the gas. It is thought that momentum or some local forces due to adjacent atoms has supplied the added energy, which was a few tenths of a volt. Thus, the metastable state energy level need not necessarily equal the ionization potential of the other gas.

Upon ionization of a single chlorine atom, the electron in its passage to the anode will excite many noble gas atoms which in turn effect further ionization of other chlorine atoms. The operation thereby generates an avalanche. The positive chlorine ions then sheath the anode, the electrons being drawn under lower and lower velocity to the anode as the sheath is completed to reduce the field gradient, so that no further excitation of the noble gas or ionization of chlorine is taking place. The ions are collected by the cathode and neutralized in energy levels all below the work function of the cathode. No cathode emission occurs. The tube is ready for another discharge.

It is manifest that the generation of the avalanche differs from that in a conventional Geiger tube. It does not demand a high potential gradient for ionization. The central electrode may therefore be large. Ionization may be initiated anywhere in the tube.

In lower proportions of chlorine, other effects take place in that self quenching of the counter is not obtained, although low operating voltages may be used.

Counters of the type described offer numerous advantages beyond the low voltage operation. They are exceptionally rugged. Practically all organic vapor-inert gas filled Geiger counters are destroyed by sparking between the electrodes, and tubes with narrow plateaus must be carefully operated to avoid this danger. The counters of the present invention may, however, be subjected to intense arcing without deleterious effects.

The ionization is intense, and particularly with neon, is visible enough to be used as a self indicating device without more than a small low voltage battery power supply. Individual counts may be observed easily.

The operating plateaus of the low voltage counters are broad in proportion to the voltage required.

The tubes may easily be filled without demanding extreme precision. Spectroscopically pure gases should be used, but the comparatively broad range of proportions suitable for operation permits mass commercial production. Conveniently suitable mixtures of gases can be supplied for effecting the filling from a single source. Such mixtures may include more chlorine than is required, and partial filling therewith may be completed and diluted with the desired amount of noble gas.

The objects of the present invention are to count particles and radiation, to provide counters for such particles and radiation, and to provide new methods of counting such particles and radiation.

The counters of the present invention will be further described with reference to exemplary embodiments shown in the drawings, in which:

Fig. 1 shows in section a counter of the present invention,

Fig. 2 shows a section taken on the line 2—2 of Fig. 1,

Fig. 3 shows in section a construction similar in some respects to the embodiment of Fig. 1 and Fig. 4 shows breakdown potential relations of counters of the present invention.

The counter shown in Fig. 1 is similar in structure to conventional counters in that it employs a pair of coaxial electrodes within a glass envelope. The electrodes shown are of carbon applied in a liquid suspension and allowed to dry. This material provides the requisite work function for the cathode and is substantially non-reactive with the chlorine under the conditions present.

The tube comprises a cylindrical envelope 1 closed at each end. The central electrode is carried by rod 6 sealed coaxially with the envelope. The envelope structure may be evacuated and filled before final sealing at tube 10.

The outer electrode 2 is applied to the inner face of the envelope and is terminated short of end 3 of the tube structure. A lead 4 is introduced through the end and deflected to contact the electrode surface to supply one of the terminals of the counter.

The central electrode 7 is applied to the surface of rod 6. This electrode may be a metallic conducting coating sputtered or chemically deposited on the surface, or a carbon coating. Lead 8 is brought through the end 3 of the counter tube and is deflected to contact the central electrode.

The counter of Fig. 1 may be operated by supplying a positive potential to the central electrode from source 9 through resistor 31. While for normal counting operations, a resistor of the order of a megohm would be used, tubes of the types described have operated satisfactorily with resistances as low as 1000 ohms. Condenser 32 is shown connected between lead 8 and ground. In most cases this will be constituted by the distributed capacitance of the tube electrodes.

A variation of the construction of Fig. 1 is shown in Fig. 3. The inner coated electrode 7 is replaced by a wire 28 as in conventional counter manufacture. Tungsten may be used. The external electrode is formed by cylinder 26 positioned in the envelope 1 by spacers 27. Wire 28 may be extended through the ends of the tube, as was rod 6, to form the anode lead, and lead 4 may be brought into contact with cylinder 26.

Cylinder 26 is preferably nonreactive metal or carbon. In the latter case, careful out-gassing may be necessary to obtain long life of the tube, since carbon is highly absorptive.

Total pressures of the same order as in conventional Geiger counters may be used. This is normally about 10 cm., but operative counters can be made over a very wide range of pressures.

The lower pressure ratios given above are somewhat difficult to arrive at experimentally without highly sensitive manometers. The following procedure may be used, however. The envelope is evacuated. One half centimeter of chlorine, as measured by an oil manometer, is introduced. Neon is then added to a total pressure of 10.5 cm. Hg. After diffusion, the tube is pumped down to 5.25 cm., and then neon is again added up to a total pressure of 10.25 cm. By progressive steps, in this way any desired amount of chlorine may be obtained.

If the tube is operated at each dilution stage, the operating conditions are easily found and reproduced. The curve for helium is similar in configuration and has a minimum at approximately the same ratios.

In all cases, the percentages refer to the ratios of the partial pressures of the constituents.

It should be emphasized that the gases employed in these counters should be of spectroscopic purity, and that the miner proportions of impurity in commercial grades of gases will wholly prevent the desired operation.

The breakdown potentials of the counters susceptible of low voltage operation are shown qualitatively in Figure 4. The actual potentials depend on the dimensions of the physical structure and pressure employed, and are not given. It will be seen that as the noble gas is introduced, the potential drops gradually. At a particular value, of a few per cent, the potential becomes less than that of the noble gas alone and thence decreases to a minimum. As the proportion of halogen becomes very small, the potential rises to that of the pure noble gas, and self quenching terminates.

While numerical values are not given, they may be easily obtained for any tube by progressively diluting a known halogen mixture and measuring the breakdown potentials at each step. The tube is not injured by this procedure. The desired operating conditions for the tube used may thus be established and reproduced if desired.

The high voltage counters may be similarly analysed for the same purposes. The breakdown potentials vary gradually between the two pure gas values.

The invention described herein may be manufactured and used by or for the Government of the United States of America for governmental purposes without the payment of any royalties thereon or therefor.

What is claimed is:

1. An ionization pulse counter tube comprising an envelope, a pair of electrodes therein, and a gaseous filling therefor consisting essentially of chlorine and a noble gas lighter than radon in an amount less than 2.5% thereof.

2. An ionization pulse counter tube comprising an envelope, a pair of electrodes therein, and a gaseous filling therefor consisting essentially of chlorine and argon in an amount less than 2.5% thereof.

3. A low voltage counter tube comprising an envelope, a pair of electrodes therein, and a filling therefor consisting essentially of a noble gas lighter than argon and chlorine up to a few per cent.

4. A low voltage ionization pulse counter tube comprising an envelope, a pair of electrodes therein, and a filling therefor consisting essentially of neon and chlorine up to a few per cent.

5. A low voltage ionization pulse counter tube comprising an envelope, a pair of electrodes therein, and a filling therefor consisting essentially of helium and chlorine up to a few per cent.

6. A self indicating low voltage ionization pulse counter tube comprising an envelope, a pair of electrodes therein, and a gaseous filling therefor consisting essentially of neon and chlorine in an amount less than 2% of the neon.

7. An ionization pulse counter tube comprising an envelope, a pair of electrodes therein, and a gaseous filling therefor consisting essentially of xenon and chlorine up to a few percent.

8. An ionization pulse counter tube comprising an envelope, a pair of electrodes therein, and a gaseous filling therefor consisting essentially of krypton and chlorine up to few percent.

SIDNEY H. LIEBSON.

REFERENCES CITED

The following references are of record in the file of this patent:

UNITED STATES PATENTS

| Number | Name | Date |
|---|---|---|
| 2,453,886 | Ackeret | Nov. 16, 1948 |
| 2,474,851 | Liebson | July 5, 1949 |

OTHER REFERENCES

"Fundamental Properties of Electrical Discharge in Gases," by Loeb J. Wiley, New York, 1939, pages 506–511.

"Localization of the Discharge in G-M Counters," Wilkening and Kanne, Physical Review, vol. 62, Dec. 1, 1942, pages 534–537.

Electron and Nuclear Counters, Korff, D. Van Nostrand Co., New York, Apr. 1946, pages 107–108.

Handbook of Chemistry and Physics, Chemical Rubber Publ. Co., Cleveland, Ohio, 1943, page 1863.

UNITED STATES PATENT OFFICE
CERTIFICATE OF CORRECTION

Patent No. 2,590,108                                          March 25, 1952

Sidney H. Liebson

It is hereby certified that error appears in the printed specification of the above numbered patent requiring correction and that the said Letters Patent should read as corrected below.

Column 5, line 62, after "per cent" insert -- halogen --; column 6, line 16, strike out "chlorine and"; same line 16, after "radon" insert -- and chlorine --; same column 6, line 21, strike out "chlorine and"; same line 21, after "argon" insert -- and chlorine --.

Signed and sealed this 19th day of January 1960.

(SEAL)

Attest:

KARL H. AXLINE
Attesting Officer

ROBERT C. WATSON
Commissioner of Patents